United States Patent

Miura

[11] Patent Number: 5,090,521
[45] Date of Patent: Feb. 25, 1992

[54] ONE-WAY DAMPER

[75] Inventor: Osamu Miura, Saitama, Japan

[73] Assignee: Tok Bearing Co., Ltd., Tokyo, Japan

[21] Appl. No.: 634,386

[22] Filed: Dec. 27, 1990

[30] Foreign Application Priority Data

May 18, 1990 [JP] Japan .................. 2-128912

[51] Int. Cl.⁵ .......................................... F16D 63/00
[52] U.S. Cl. ...................... 188/82.1; 188/306;
188/82.84; 188/307; 16/54; 16/50; 16/337;
16/277
[58] Field of Search .............. 188/307, 296, 293, 306,
188/322.5, 82.3, 82.1, 82.8, , 82.84, 82.77;
16/54, 50, 52, 337, 277, 354, 364

[56] References Cited

U.S. PATENT DOCUMENTS

| | | | |
|---|---|---|---|
| 838,024 | 12/1906 | Hendricks | 188/82.84 |
| 1,799,662 | 4/1931 | Weiss | 188/307 |
| 4,415,069 | 11/1983 | Eisemann | 188/82.84 |
| 4,756,051 | 7/1988 | Shy | 16/50 |
| 4,825,503 | 5/1989 | Shiramasa | 188/306 |
| 4,877,113 | 10/1989 | Taig | 188/82.84 |

*Primary Examiner*—Sherman Basinger
*Assistant Examiner*—Christopher P. Ellis
*Attorney, Agent, or Firm*—Fleit, Jacobson, Cohn, Price, Holman & Stern

[57] ABSTRACT

A one-way damper comprising a cylindrical outer frame 10 with one end closed within which is provided a cylindrical inner frame 20 in a state rotatable relative thereto, packing material G packed between said inner and outer frames, and when a relative rotation being caused between said both inner and outer frames the rotation of said frame of one side may be capable of giving resistance to the rotation of said frame of other side, and inside of said inner frame 20 being provided with a mechanism which may perform meshing and removal according to a direction of rotation of a rotary shaft 50 for effecting transmission and non-transmission of torque from said rotary shaft 50 to said inner frame 20.

3 Claims, 2 Drawing Sheets

ONE-WAY DAMPER

BACKGROUND OF THE INVENTION

(1) Field of the Invention

The present invention relates to a one-way damper comprising a clutch constitution for rotating or suspending a rotary shaft relatively in accordance with the direction of rotation given to the rotary shaft used for a rotary portion.

(2) Description of Prior Art

A device, for example, which may act on a member material which has been urged in a certain direction, and which device diminishes the movement of such member material may be called a damper. Such an example of damper device can often be seen in door-closers, wherein the speed of door closing, namely, the rotating speed of a hinge shaft changes in accordance with the adjustment resistance force of the piston sliding within the cylinder.

Such a damper device, however, cannot directly be set in the rotating shaft portion so that problems arise that it is not suitable for use, for example, in the rotating shaft portions of a machine device except for cases where there is a space for mounting the damper device there.

Against thereto, there is known a device wherein torque is transmitted when rotated only in one direction and not transmitting the torque when rotated in the reverse direction thereto; as an example, the one-way clutch of the U.S. Pat. No. 4,236,619 can be indicated. As the device of the invention is a clutch, its action is only an alternative whether or not to transmit the torque.

The inventor of the present invention, however, after studying bearing devices and the like such as called one-way clutch or one-way bearing has obtained the trust that it may be possible to constitute a one-way damper utilizing the constitution of such bearing devices.

The present invention has been made from this viewpoint.

SUMMARY OF THE INVENTION

Accordingly, an object of the present invention is to provide a one-way damper wherein it may be possible to rotate the shaft almost without transmitting the driving torque or giving the necessary torque according to the direction of rotation to be given to the rotary shaft used for the rotary portions.

Conventional clutch devices used for transmitting the torque in one direction have been composed to require a number of precisely worked parts so that their manufacturing cost may be expensive and also problems often occur that its operation becomes wrong in accordance with bad working condition of the parts of some portions.

Accordingly, one object of the present invention is to provide a one-way damper wherein no such problems occurs.

Another object of the present invention is to provide a one-way damper which is able to brake one-way rotation of a specific shaft within a predetermined range whereby the shocking is softened giving no resistance to the reverse rotation and especially of simple constitution to enable to be manufactured at low cost and also fitted to any desired material.

The afore-mentioned object is attained by a one-way damper having an outer frame 10 having a cylindrical chamber 11 which is open at one end of the axial direction and closed at the other end and an inner frame 20 which has a cylindrical form and is open, like as the said outer frame, at one end and closed at the other end and having an inner tooth 21 formed along with its inner cylindrical surface and rotatably provided within the said vacant chamber 11, packing material G packed between the outer surface of the inner frame and the wall surface of the vacant chamber and seal member 30 which seals the packing material G at the open side of the both frames, a rotary shaft 50 inserted rotatably into the key hole 41 provided in the cover 40 for closing the open mouth at one end of the outer frame 10 having the end part 51 inserted into the inner frame from the side of the open mouth, a gear 61 which is axially supported by the end part 51 and geared with the inner gear 21, and a floating gear 62 which races when the rotary shaft 50 rotates to one direction and which is able to gear with the gear 61 and the inner gear 21 when rotates in the reverse direction.

BRIEF DESCRIPTION OF THE DRAWINGS

The drawings show one example embodying a damper of this invention, wherein.

DESCRIPTION OF PREFERRED EMBODIMENT

In the following, the invention will be explained with reference to the drawings.

Figure 1:
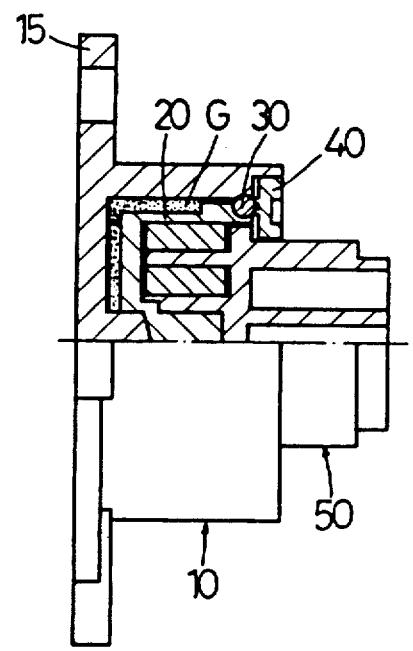
FIG. 1 shows a side view partly in section.
Figure 3:
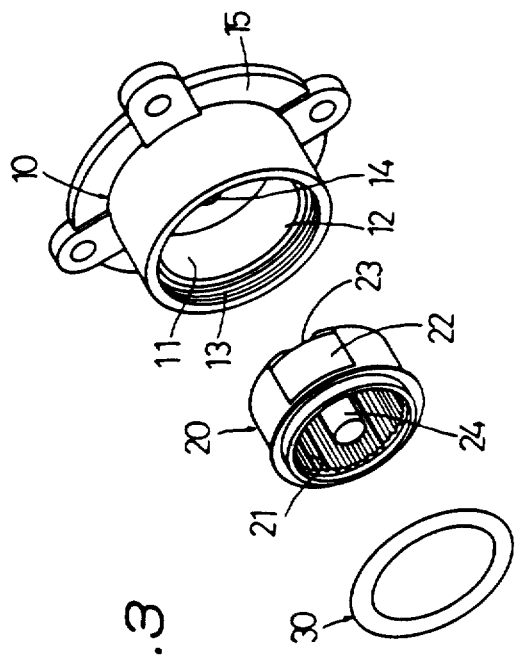
FIG. 3 is an exploded view.

The exemplified damper has, as shown in FIG. 1 or FIG. 3, a totally cylindrical outer frame or casing 10 and a cylindrical inner frame or casing 20 combined therein and between the both frames 10 and 20 there is packed the packing material or damping fluid G which may give the required resistance to the predetermined direction of rotation.

The outer frame 10 has a hollow chamber 11 and one end of the axial direction thereof is an opening 12, but the other end is closed and a fitting plate 15 is formed solidly therewith.

The inner frame 20, which is a rotatable cylindrical member, is set within the hollow chamber 11 and, like as the outer frame 10, one end thereof is open the other end being closed and has inner gear teeth 21 formed along with the inner circumference thereof.

For packing the packing material G, a plurality of recesses 22 are formed on the outer circumference thereof symmetrically around the shaft and they are interconnected with each other by passages 23.

Sealing material 30 is provided at the opening of the outer frame 10 in order to avoid escaping of the packing material G. As the packing material G, so-called torque grease, and the like, and for the seal material 30, an O-ring etc. can be used, respectively.

The cover 40 closes the opening 12 of the outer frame 10 and also is a member to become the bearing of the rotary shaft 50 and centrally thereof has a shaft 41 into which is rotatably inserted the rotary shaft 50.

On the outer surface of rotary shaft 50, there is formed a brim 55 by which is hanged the shaft 50 from inside on the shaft hole 41 so that the end portion 51 inside from the brim 55 is the portion to be inserted internally of the inner frame 20.

The cover 40 is set by gearing with the internal thread 13 of the internal circumference of the open end of the outer cylinder by means of the external thread 42 of the outer circumference, and the rotary shaft 50 is axially supported on the central axis 24 of the inner frame 20 by means of the brim 55 of the end center and the inner frame 20 is axially supported on the central axis 14 of the outer frame 10 by means of the centre hole 25.

At the end 51 of the rotary shaft 50 there are provided fixed pinions 61 by support shaft 53. As the pinions 61 rotate always meshing with the inner teeth 21 notwithstanding the direction of rotation, they are provided at two locations or more than that symmetrically with the central axis interpositioned therebetween.

Figure 6:
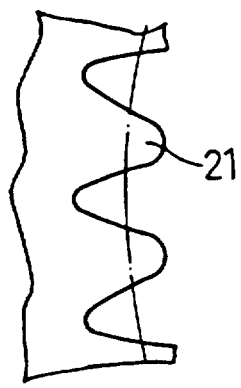
FIG. 6 is an enlarged view of the inner teeth.
Figure 7:
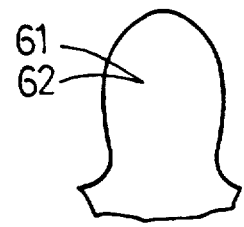
FIG. 7 is an enlarged view of the tooth form of the gear.
Figure 5:
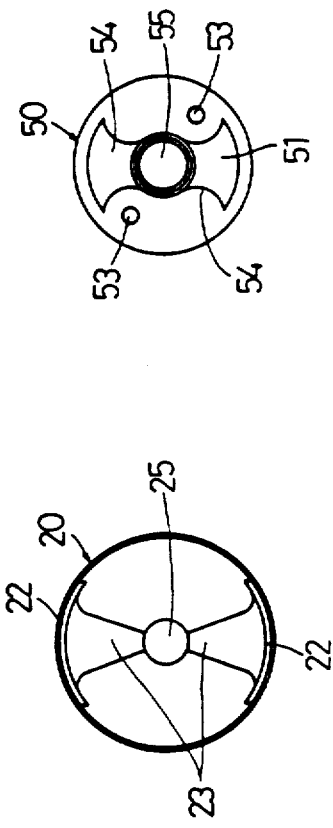
FIG. 5 shows the end elevation of the rotary shaft.
Figure 4:
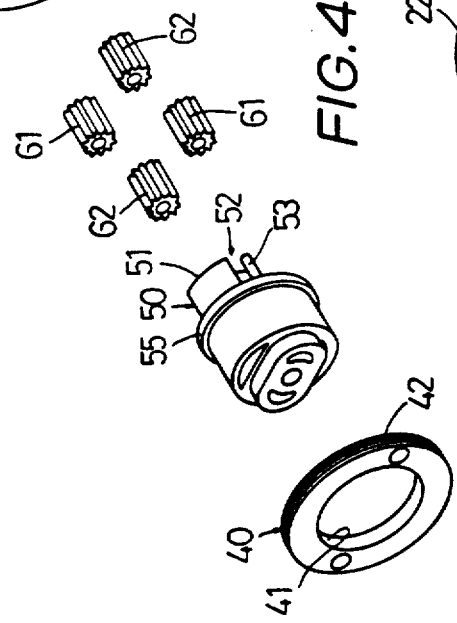
FIG. 4 is a bottom view of the other end side of the inner frame.

In order to contain the pinions 61 and the floating pinions 62 capable of meshing therewith on the circumference of the end 51 there are provided profiled pockets 52 and when the rotary shaft rotates in one direction, the inner teeth 21 and pinions 61 of the fixed axis and floating pinions 62 mesh together and when it rotates in the reverse direction it does not mesh with the both and races so that arc form recesses 54 are provided in the pockets for limiting the positions of the pinions 62 (Refer to FIG. 5). Any type of tooth form will do for the pinions 61, 62 and inner teeth 21; the reliability, however, may be much increased when the tooth form with almost no width of rotation in the direction of rotation is employed (Ref. to FIG. 6 and FIG. 7).

Figure 2:
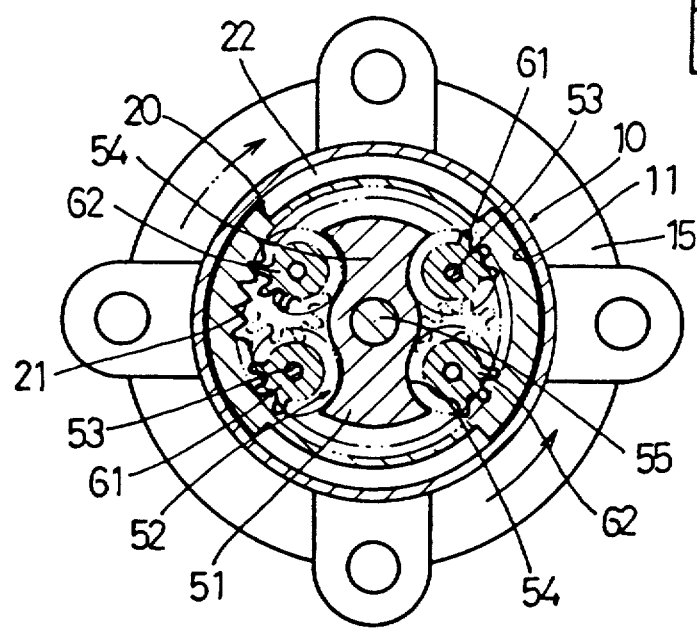
FIG. 2 is a cross sectional view of the main portion.

In a one-way damper constructed as above, when the rotary shaft rotates in one direction relative to the outer frame 10 of the solid side, namely, in the exemplified case, to the leftward in FIG. 2, pinions 61 which mesh with the inner teeth 21 rotates ahead in the same direction while the rotating pinions 62 rotate floatingly between the inner teeth 21, recesses 54 and the pinions 61 so that the rotation of the rotary shaft 50 will not be disturbed at all.

However, in the reverse direction, namely, when the rotary shaft 50 rotates in the right-hand direction in the exemplified case, pinions 61 rotate in the same direction along with the right-hand rotation of the inner teeth 21 and the floating pinions 62 which are preceeding in the direction of rotation mesh with the inner teeth 21 and the pinions 61 so that each of the gears become unable to rotate further whereby the rotary shaft 50 becomes in the state locked with the inner frame 20.

In this locked state, the rotary shaft 50 and the inner frame 20 become as one body, but the inner frame 20 and the outer frame 10 are in the state to rotate relatively; namely, the packing material G is packed between both frames 10, 20, and when the external force containing its viscosity within the range of resistance between both frames is added to the rotary shaft 50 it stops the shaft, but if added the torque more than that it becomes to act as breaking.

Accordingly, in accordance with the present invention, it may be possible to construct very simply a one-way damper by means of at least 2 or 4 pinions 61, 62 or so and the inner teeth 21, and the effect of one-way rotation and stoppage is effected by the removal racing and meshing together of floating pinions and which is sure to act without necessity of high grade preciseness and as the production is especially easy, it is suitable to make mass production and helps to lower the cost.

I claim:

1. A one-way damper comprising a fixed outer casing, an inner casing rotatably mounted in the outer casing, a damping fluid between the inner casing and the outer casing, the inner casing having an interior space formed with a peripheral ring gear, a shaft member rotatably mounted in the interior space, the shaft member defining a profiled pocket, a fixed pinion rotatably mounted on the shaft member in the pocket and meshing with the ring gear, and a floating pinion in the pocket adjacent the fixed pinion, the shaft member being freely rotatable within the interior space in one direction of rotation wherein the fixed pinion leads the floating pinion, and the floating pinion forming a drive connection between the shaft member and the inner casing in an opposite direction of rotation of the shaft member, whereby the inner casing is caused to rotate with the shaft member to provide damped rotation of the shaft member and the inner casing within the outer casing.

2. A damper as claimed in claim 1 wherein the pocket, the fixed pinion and the floating pinion are replicated on diametrically opposite sides of the shaft member.

3. A damper as claimed in claim 1 wherein the inner casing has interconnected circumferential recesses containing the damping fluid.

* * * * *